(12) United States Patent
Yoshikawa et al.

(10) Patent No.: US 7,715,073 B2
(45) Date of Patent: May 11, 2010

(54) HOLOGRAM RECORDER

(75) Inventors: Hiroyasu Yoshikawa, Kawasaki (JP); Koichi Tezuka, Kawasaki (JP); Kazushi Uno, Kawasaki (JP); Yasumasa Iwamura, Kawasaki (JP); Yuzuru Yamakage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/110,107

(22) Filed: Apr. 25, 2008

(65) Prior Publication Data
US 2008/0239421 A1 Oct. 2, 2008

Related U.S. Application Data

(63) Continuation of application No. PCT/JP2006/313071, filed on Jun. 30, 2006.

(30) Foreign Application Priority Data

Oct. 25, 2005 (WO) ................. PCT/JP2005/019598

(51) Int. Cl.
*G03H 1/28* (2006.01)
(52) U.S. Cl. .......................... 359/24; 359/11
(58) Field of Classification Search ................... 359/11, 359/21, 24
See application file for complete search history.

(56) References Cited

U.S. PATENT DOCUMENTS

| 3,819,248 | A | * | 6/1974 | Takeda et al. ................. 359/21 |
| 6,023,355 | A | * | 2/2000 | Bashaw et al. ................ 359/21 |
| 2004/0100892 | A1 | * | 5/2004 | Horimai ....................... 369/103 |
| 2004/0145994 | A1 | * | 7/2004 | Tsukagoshi ................. 369/103 |
| 2005/0243389 | A1 | | 11/2005 | Kihara |

FOREIGN PATENT DOCUMENTS

| EP | 0 632 348 A1 | 1/1995 |
| EP | 1 624 451 A1 | 2/2006 |
| JP | A 7-20765 | 1/1995 |
| JP | A 2004-335044 | 11/2004 |
| JP | A 2005-135479 | 5/2005 |
| JP | A 2005-292687 | 10/2005 |
| JP | A 2006-107663 | 4/2006 |
| WO | WO 2004/102542 A1 | 11/2004 |

\* cited by examiner

*Primary Examiner*—Alessandro Amari
(74) *Attorney, Agent, or Firm*—Greer, Burns & Crain, Ltd.

(57) ABSTRACT

A hologram recorder is provided, in which coherent light from a light source is split into a signal beam and a reference beam, and the signal beam is modulated by a spatial light modulator to be directed to a hologram recording medium, while the reference beam is directed to the hologram recording medium to overlap with the signal beam for recording a hologram on the hologram recording medium. The hologram recorder includes a beam phase modulator provided with a plurality of optical devices (20$p$, 20$p'$) each configured to assume one of two modes such as ON mode and OFF mode, the ON mode for causing the reference beam to be passed or reflected in a predetermined direction toward the hologram recording medium, the OFF mode for causing the reference beam to be blocked or directed in another direction other than the predetermined direction. Each optical device (20$p$, 20$p'$) provides a phase difference 0 or $\pi$. A phase modulation controller is also provided for individually controlling the optical devices (20$p$, 20$p'$) to cause each of the optical devices to assume the ON mode or the OFF mode, thereby modulating the reference beam into a beam having a predetermined phase pattern.

13 Claims, 16 Drawing Sheets (A)

(B)

HOLOGRAM RECORDER

This application is a continuation of International Application No. PCT/JP/2006/313071, filed Jun. 30, 2006.

FIELD OF THE INVENTION

The present invention relates to a hologram recorder for recording holograms by directing a signal beam and a reference beam onto a recording medium in an overlapping manner.

BACKGROUND ART

A conventional hologram recorder is disclosed in Patent Document 1 for example. The hologram recorder disclosed therein records holograms in a hologram recording medium by means of a phase code multiplexing method. Laser light which comes out of a beam source is split by a beam splitter into signal light (signal beam) and reference light (reference beam). The signal beam is modulated by a spatial light modulator into a beam of a pattern according to the information to be recorded, and then directed to the hologram recording medium. The reference beam is modulated by a phase encoding multiplexer into a beam of an appropriate phase pattern thereby given a phase code. The phase encoding multiplexer, which is a transparent liquid-crystal device having a large number of cells, gives the incoming reference beam a predetermined phase difference per each cell, thereby modulating the reference beam into a transmitted beam which has a desired phase pattern. After the phase modulation, the reference beam is directed to the hologram recording medium so that the beam will overlap with the signal beam in the hologram recording medium. As a result, a hologram which is made of interference stripes (page pattern) of the signal beam and the reference beam is recorded. In this process, if the modulation patterns (pixel pattern or phase pattern) of the signal beam and of the reference beam are varied without changing the beam irradiation site on the hologram recording medium, holograms of various page patterns according to the modulation patterns are recorded in a multiplex manner in the beam irradiation site. This is how the phase code multiplexing method is implemented.

Patent Document 1: JP-A-H07-20765

However, the above-described conventional hologram recorder is designed to have an optoelectrical characteristic: Namely, in each of the cells in the liquid-crystal device through which the reference beam passes, a phase difference is generated in accordance with a drive voltage, through the use of birefringence. In such an arrangement where birefringence is utilized in order to generate a discretional phase pattern, a complicated voltage application control must be performed for each cell, resulting in complication in terms of configuration and workings for the phase modulation.

In the case of e.g. a typical transmissive liquid-crystal device using nematic liquid crystal molecules, very fine variable control, like a gradation expression control, must be performed for voltage application per each of the cells every time the phase pattern is varied. In addition, the response speed of liquid crystal molecules is not very high, which leads to slow hologram recording per page. In this respect, there has been room for improvements.

DISCLOSURE OF THE INVENTION

The present invention has been proposed under the above-described circumstances. It is an object of the present invention to provide a hologram recorder which has a simplified configuration and workings for phase modulation using the phase code multiplexing, and is capable of recording holograms at higher speed.

In order to solve the above-described problems, the present invention makes use of the following technical means.

A first aspect of the present invention provides a hologram recorder in which coherent light from a light source is split into a signal beam and a reference beam, the signal beam is modulated by a spatial light modulator to be directed to a hologram recording medium, the reference beam is directed to the hologram recording medium to overlap with the signal beam for recording a hologram on the hologram recording medium. The hologram recorder comprises: a beam phase modulator including a plurality of optical devices each configured to assume one of two modes such as ON mode and OFF mode, the ON mode for causing the reference beam to be passed or reflected in a predetermined direction toward the hologram recording medium, the OFF mode for causing the reference beam to be blocked or directed in another direction other than said predetermined direction, each optical device providing a predetermined phase difference; and a phase modulation controller for individually controlling the optical devices to cause each of the optical devices to assume the ON mode or the OFF mode, thereby modulating the reference beam into a beam having a predetermined phase pattern.

A second aspect of the present invention provides a hologram recorder comprising a spatial light modulator that includes a first beam modulation region and a second beam modulation region, the first beam modulation region configured to modulate part of coherent light from a light source into a signal beam and to direct the signal beam toward a hologram recording medium, the second beam modulation region configured to modulate remaining part of the coherent light from the light source into a reference beam and to direct the reference beam along a same optical path as the signal beam, where the reference beam is directed to the hologram recording medium to overlap with the signal beam to record a hologram on the hologram recording medium. The second beam modulation region is provided with a plurality of optical devices each configured to assume one of two modes such as ON mode and OFF mode, the ON mode for causing the reference beam to be passed or reflected in a predetermined direction toward the hologram recording medium, the OFF mode for causing the reference beam to be blocked or directed in another direction other than said predetermined direction, where each optical device provides a predetermined phase difference. The hologram recorder further comprises a phase modulation controller for individually controlling the optical devices to cause each of the optical devices to assume the ON mode or the OFF mode, thereby modulating the reference beam into a beam having a predetermined phase pattern.

Preferably, the optical devices may include first types of 0 phase difference and second types of $\pi$ phase difference as the predetermined phase difference, these two types being disposed alternately with each other.

Preferably, the optical devices may be grouped into cells each including a predetermined number of optical devices, the phase modulation controller performs control for each cell so that at least one of the 0 phase difference type and the $\pi$ phase difference type in said each cell is in the OFF mode.

Preferably, the predetermined phase pattern may be generated by light of 0 phase difference and light of $\pi$ phase difference at an interval defined by a predetermined number of the cells.

Preferably, the predetermined phase pattern may correspond to a Walsh-Hadamard Transform matrix pattern.

Preferably, the predetermined phase pattern may be generated randomly for each cell by light of 0 phase difference and light of π phase difference.

Preferably, the phase modulation controller may perform control for each of the optical devices so that said each optical device is randomly in the ON mode or the OFF mode, the predetermined phase pattern being generated randomly by light of 0 phase difference or light of π phase difference for each optical device.

Preferably, the optical devices may comprise liquid crystal devices of alternately different thicknesses.

Preferably, the optical devices may be provided by a plurality of movable reflection devices cooperating to form a beam reflection surface, each movable reflection device assuming a predetermined tilt angle with respect to the beam reflection surface upon coming into the ON mode or the OFF mode.

Preferably, the movable reflection devices may satisfy a condition given by following equations, where d represents a pitch between mutually adjacent devices, φ represents the predetermined tilt angle with respect to the beam reflection surface, θi and θo represent a beam incoming angle and a beam reflection angle with respect to the beam reflection surface, λ represents a wavelength of the beam, and m represents an integer, $$\frac{\sqrt{2}}{2}d(\sin\theta i + \sin\theta o) = \left(m + \frac{1}{2}\right)\lambda,$$ Formula 1

$$\theta i + \theta o = 2\phi.$$ Formula 2

BEST MODE FOR CARRYING OUT THE INVENTION

Preferred embodiments of the present invention will be described below with reference to the drawings. FIG. 1 through 4 show a hologram recorder according to a first embodiment of the present invention.

Figure 1:
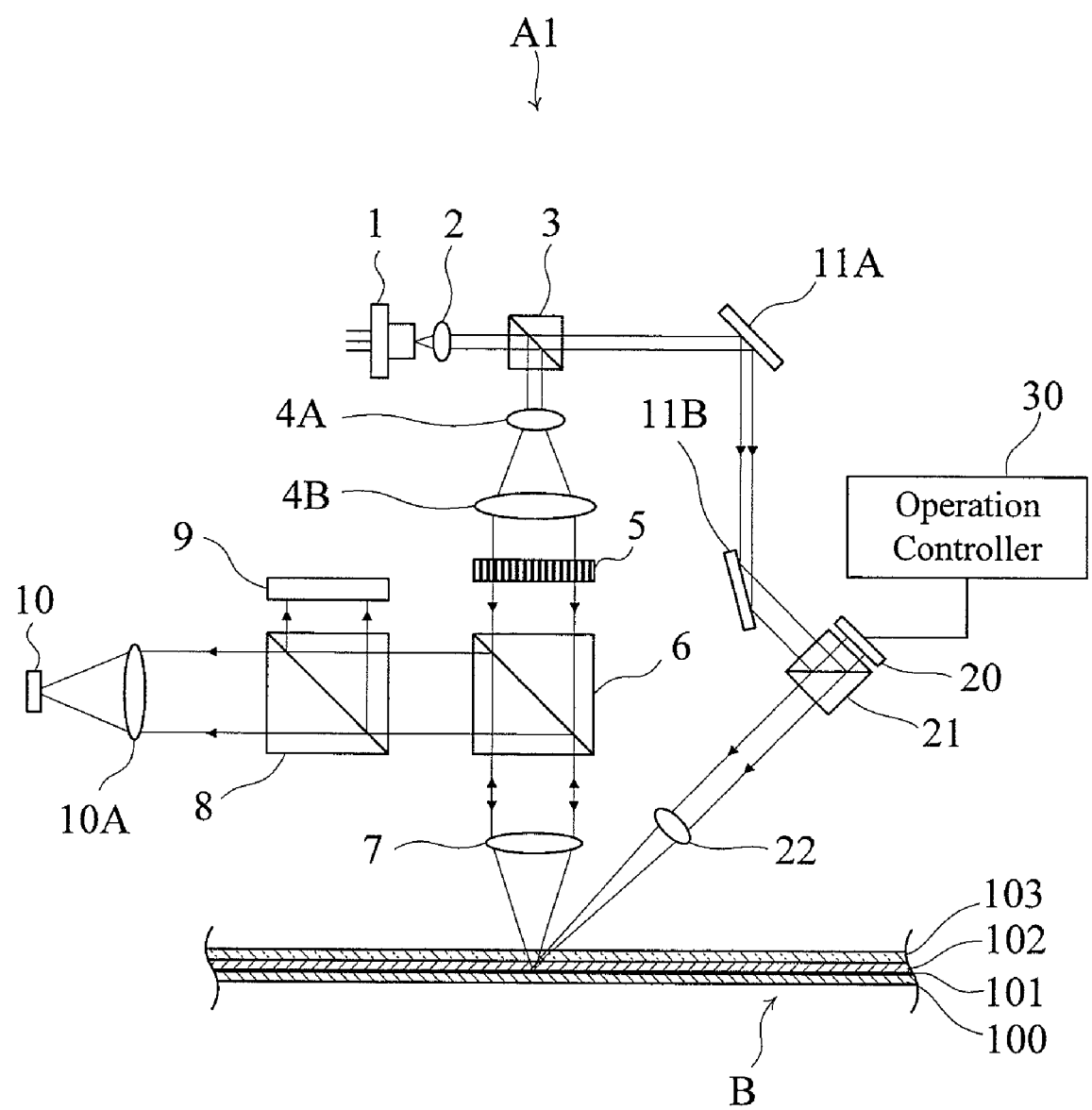
FIG. 1 is a configuration diagram of a hologram recorder according to a first embodiment of the present invention.

As shown in FIG. 1, the hologram recorder A1 records holograms on a hologram recording medium B (only partially shown in the figure) in a multiplex manner by a phase code multiplexing method. The recorder A1 is also designed to reconstruct the recorded holograms. The hologram recorder A1 includes a beam source 1, a collimator lens 2, a first beam splitter 3 for signal beam/reference beam, beam expanders 4A, 4B, a spatial light modulator 5, a second beam splitter 6 and an object lens 7 for signal beam/reconstruct beam, a third beam splitter 8 for separation of the reconstruct beam, a beam reception sensor 9 for reconstruct operation, a condenser lens 10A and a beam reception sensor 10 for servo control, reference beam reflector plates 11A, 11B, a reflective phase modulator (beam phase modulation means) 20, a fourth beam splitter 21 for reference beam, an object lens 22 for reference beam, and an operation control section (phase modulation controller) 30 which controls the phase modulator 20.

The hologram recording medium B, which is a disc, has a laminate structure including a support substrate layer 100, a reflection layer 101, a hologram recording layer 102, and a transparent substrate layer 103 laminated in this order. On the hologram recording layer 102, holograms each made of interference stripes (page patterns) are recorded when a signal beam and a reference beam are thrown in an overlapping manner. The reflection layer 101 is formed with emboss pits (not illustrated). The emboss pits cause changes in the reflected beam, which are detected by the beam reception sensor 10 for servo controls such as track control, focus control as well as tilt control.

The beam source 1 is provided by a semiconductor laser device for example, and emits a laser beam which has a relatively narrow band and a highly interfering nature. The collimator lens 2 converts the laser beam from the beam source 1 into a parallel beam. The parallel beam which comes out of the collimator lens 2 is split into a signal beam and a reference beam by the first beam splitter 3. The beam expanders 4A, 4B increase the beam diameter of the signal beam. Thereafter, the signal beam enters the spatial light modulator 5. The reference beam proceeds to the reflector plates 11A, 11B, the fourth beam splitter 21, and then enters the phase modulator 20.

The spatial light modulator 5 is provided by a transmissive liquid-crystal device for example. The spatial light modulator 5 modulates the incoming signal beam into a beam having a pixel pattern according to the information to be recorded. After leaving the spatial light modulator 5, the signal beam passes through the second beam splitter 6, is condensed by the object lens 7, and then hits a predetermined part (beam irradiation site) in the hologram recording medium B. When reconstructing, a reconstruct beam is generated when a reference beam interferes with the hologram on a beam irradiation site in the hologram recording layer 102. The reconstruct beam passes through the object lens 7, the second beam splitter 6, and the third beam splitter 8, and then enters the beam reception sensor 9, where information recorded in the form of hologram is optically read out. Also, when recording as well as when reconstructing, a beam which has reflected on the emboss pits in the reflection layer 101 passes through the object lens 7, the second beam splitter 6, the third beam splitter 8, and the condenser lens 10A, and then enters the servo-purpose beam reception sensor 10, whereby the beam irradiation site on the hologram recording medium B is adjusted appropriately.

The phase modulator 20 is provided by a reflective liquid-crystal device which has ferroelectric liquid crystal molecules. As shown partially in FIG. 2, the phase modulator 20 is composed of a large number of minimum constituent units or liquid crystal devices 20p, 20p', disposed in a grid pattern, providing a beam reflection surface 20A as a whole. The liquid crystal devices 20p, 20p' are spaced vertically and horizontally from each other by a pitch d which is 10 through 20 μm for example. Each of the liquid crystal devices 20p, 20p' has a thickness which has a structure (not illustrated) including a back surface side reflection electrode substrate, a beam incoming side transparent electrode substrate, and ferroelectric liquid crystal molecules sealed in between. As shown clearly in FIG. 3, unlike the liquid crystal devices 20p, the liquid crystal devices 20p' have their beam incoming surface formed with a phase film 20m which generates a phase difference π. The liquid crystal devices 20p output a reflected beam whose phase difference is 0. On the other hand, the liquid crystal devices 20p' output a reflected beam whose phase difference is π.

For example, when a constant-voltage is applied to a liquid crystal device 20p whose phase difference is 0, the liquid crystal device 20p is in ON mode, where a beam whose phase difference is 0 is reflected in a predetermined direction at a reflection angle θo that is equal to an incoming angle θi. When no voltage is applied to the liquid crystal device 20p, the liquid crystal device 20p is in OFF mode, and blocks the beam, and therefore there is no reflected beam. Likewise, when a constant-voltage is applied to a liquid crystal device 20p' whose phase difference is π, the liquid crystal device 20p' assumes an ON mode, where a beam whose phase difference is π is reflected in a predetermined direction at a reflection angle θo that is equal to an incoming angle θi. When no voltage is applied to the liquid crystal device 20p', the liquid crystal device 20p' assumes an OFF mode, and blocks the beam, and therefore there is no reflected beam. The liquid crystal device 20p whose phase difference is 0 and the liquid crystal device 20p' whose phase difference is π as described above are placed in an alternate manner in an array.

Figure 2:
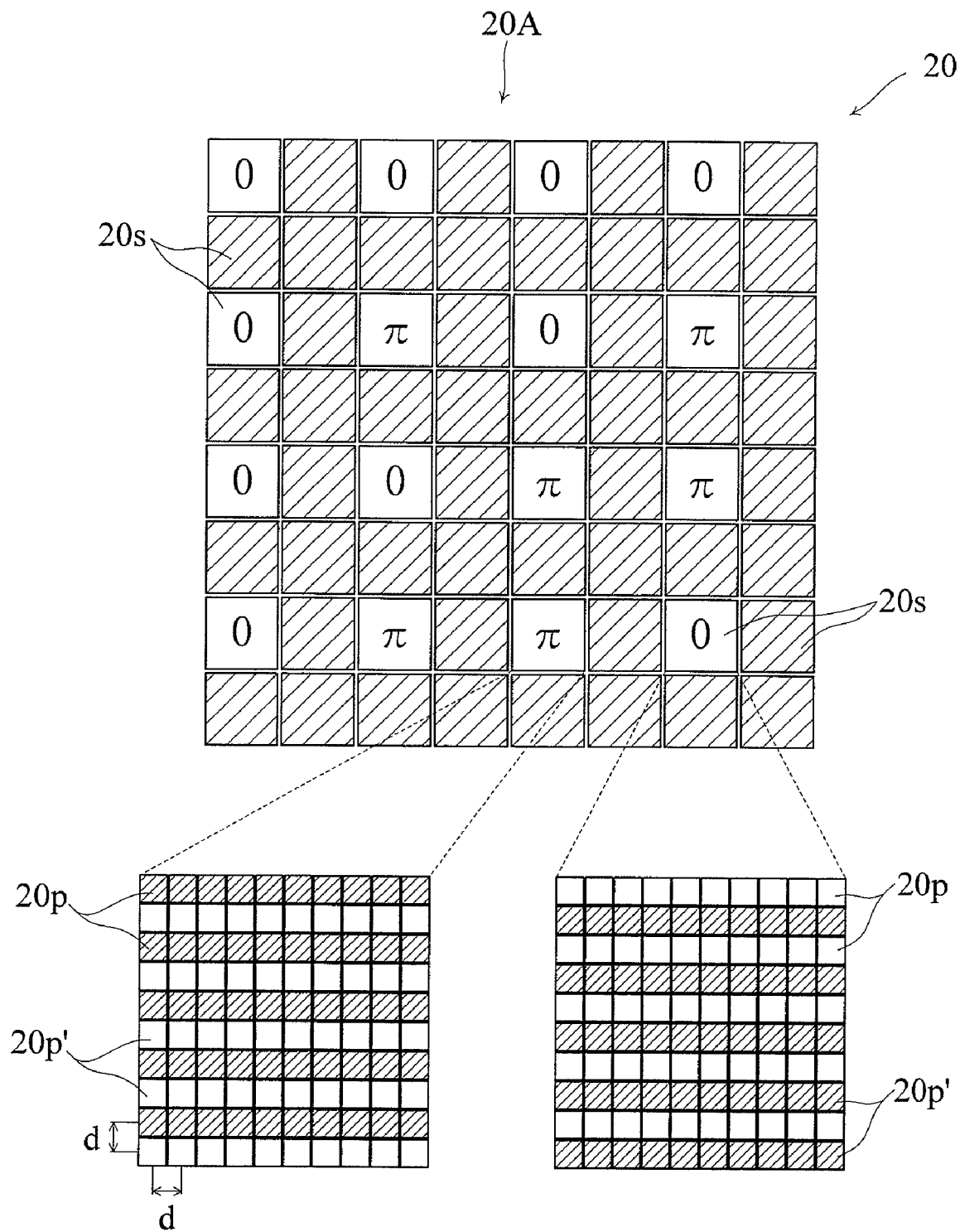
FIG. 2 is a plan view of a phase modulator which represents a primary portion of the hologram recorder in FIG. 1.

Again, as shown in FIG. 2, an array of the pixels 20p, 20p', e.g. 10×10 of them in vertical and horizontal directions, represents a unit area or a cell 20s. The operation control section 30 controls the liquid crystal devices 20p whose phase difference is 0 and the liquid crystal devices 20p' whose phase difference is π for each cell 20s. Specifically, when performing phase modulation, three types of cell conditions are created: Beam blocking cell (indicated by hatched cells 20s) in which both kinds of the liquid crystal devices 20p, 20p', or the liquid crystal devices whose phase difference is 0 and whose phase difference is π all assume the OFF mode, and therefore there is no reflected beam; Zero-type cell (indicated by those cells 20s marked with 0) in which only the liquid crystal devices 20p whose phase difference is 0 assume the ON mode to give reflected beams whose phase difference is 0; and Pi-type cell (indicated by those cells 20s marked with π) in which only the liquid crystal devices 20p' whose phase difference is π assume the ON mode to give reflected beams whose phase difference is π are created. The zero-type and pi-type cells 20s are alternated with each other to sandwich the beam blocking cell 20s in between in the vertical and horizontal directions. The phase pattern is formed by these three types of the cell 20s, and thus, it is possible to change the phase pattern to whatever pattern desirable, by simply changing the layout pattern of the zero-type and the pi-type cells 20s. A phase pattern which is particularly suitable for phase modulation is one which corresponds to a Walsh-Hadamard Transform determinant as exemplified in FIG. 2.

Figure 3:
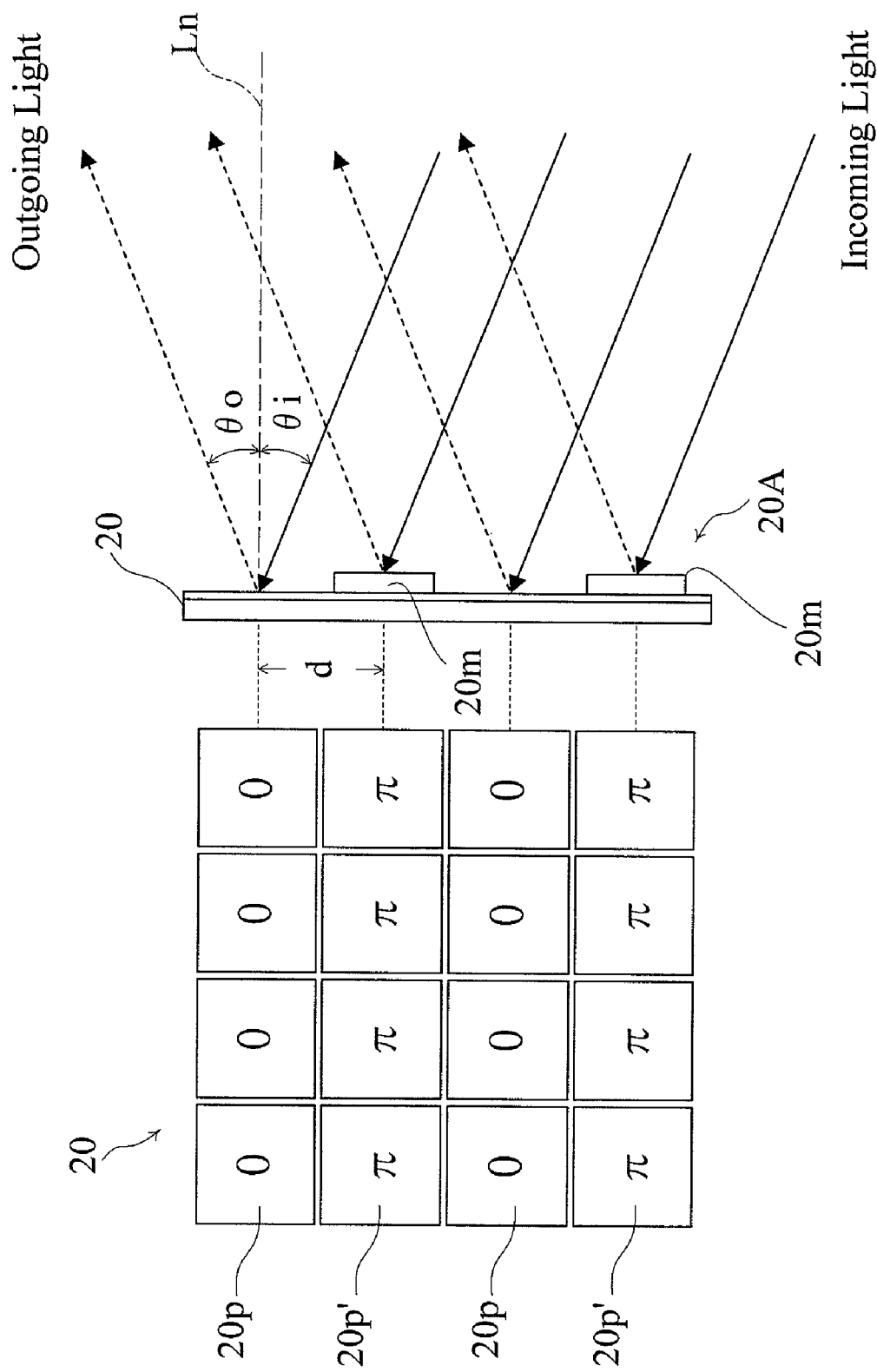
FIG. 3 is a conceptual diagram for describing an optical characteristic of the phase modulator in FIG. 2.
Figure 4:
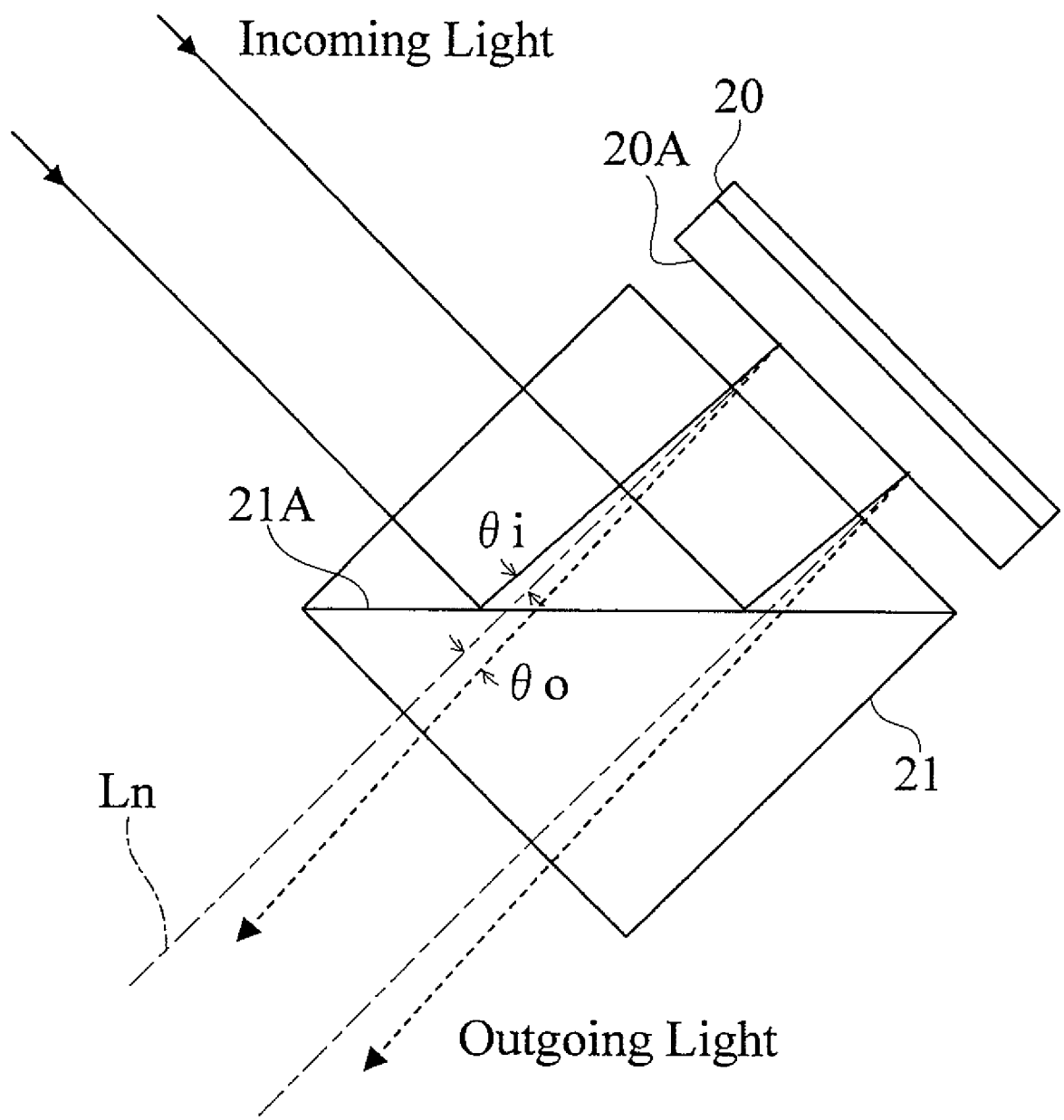
FIG. 4 is an optical path diagram showing optical paths in the phase modulator in FIG. 2.

As shown in FIG. 3 and FIG. 4, the reference beam's incoming angle with respect to the beam reflection surface 20A is θi as a result of, e.g., finely adjusting the beam reflection surface 21A (See FIG. 4) of the fourth beam splitter 21. The incoming angle θi being such, the reference beam's reflection angle θo is symmetrical with respect to a normal line Ln drawn to the beam reflection surface 20A, and thus the incoming angle θi and the reflection angle θo are equal to each other.

The reference beam which comes out of the phase modulator 20 as a reflected beam travels again through the fourth beam splitter 21, then is condensed by the object lens 22, and hits the beam irradiation site of the hologram recording medium B in an overlapping manner with the signal beam. In this process, the signal beam pixel pattern and the reference beam phase pattern are varied without changing the beam irradiation site in the hologram recording medium B, so that multiplex recording of holograms are made which have various page patterns according to the interference between the pixel pattern and the phase pattern on the beam irradiation site. This implements a phase code multiplexing method which does not involve mechanical operation. Since the reference beam has a phase pattern which, as a whole, is a result of thinning by the beam blocking cell 20s, each individual beam which comes from non beam-blocking cells, i.e. pi-type or zero-type cells 20s enters the hologram recording medium B at a relatively larger incoming angle than Bragg angle. This enables to reduce crosstalk among holograms which are recorded in a multiplex manner in each page.

According to the reflective phase modulator 20 as described above, it is possible to modulate the reference beam into a beam of a desirable phase pattern by simply turning the liquid crystal devices 20p, 20p' into the ON/OFF modes, and therefore it is possible to perform voltage application control on each liquid crystal devices 20p, 20p' easily.

The ferroelectric liquid crystal molecules which constitute the liquid crystal devices 20p, 20p' have a significantly faster response speed than typical nematic liquid crystal molecules. Therefore, it is possible to switch the phase pattern more quickly, and hence to increase the hologram recording speed per page. For example, when a conventional nematic liquid crystal molecule liquid-crystal device is used, an achievable page recording speed is 100 pages/sec. On the contrary, when a ferroelectric liquid crystal molecule liquid-crystal device is used as in the present invention, an achievable page recording speed is approximately 1000 pages/sec, which makes possible to further enhance the advantages of the non-mechanical phase code multiplexing method.

Therefore, according to the hologram recorder A1 offered by the present embodiment, it is possible to simplify configuration and workings for phase modulation using the phase code multiplexing, and hence it becomes possible to increase hologram recording speed.

Figure 5:
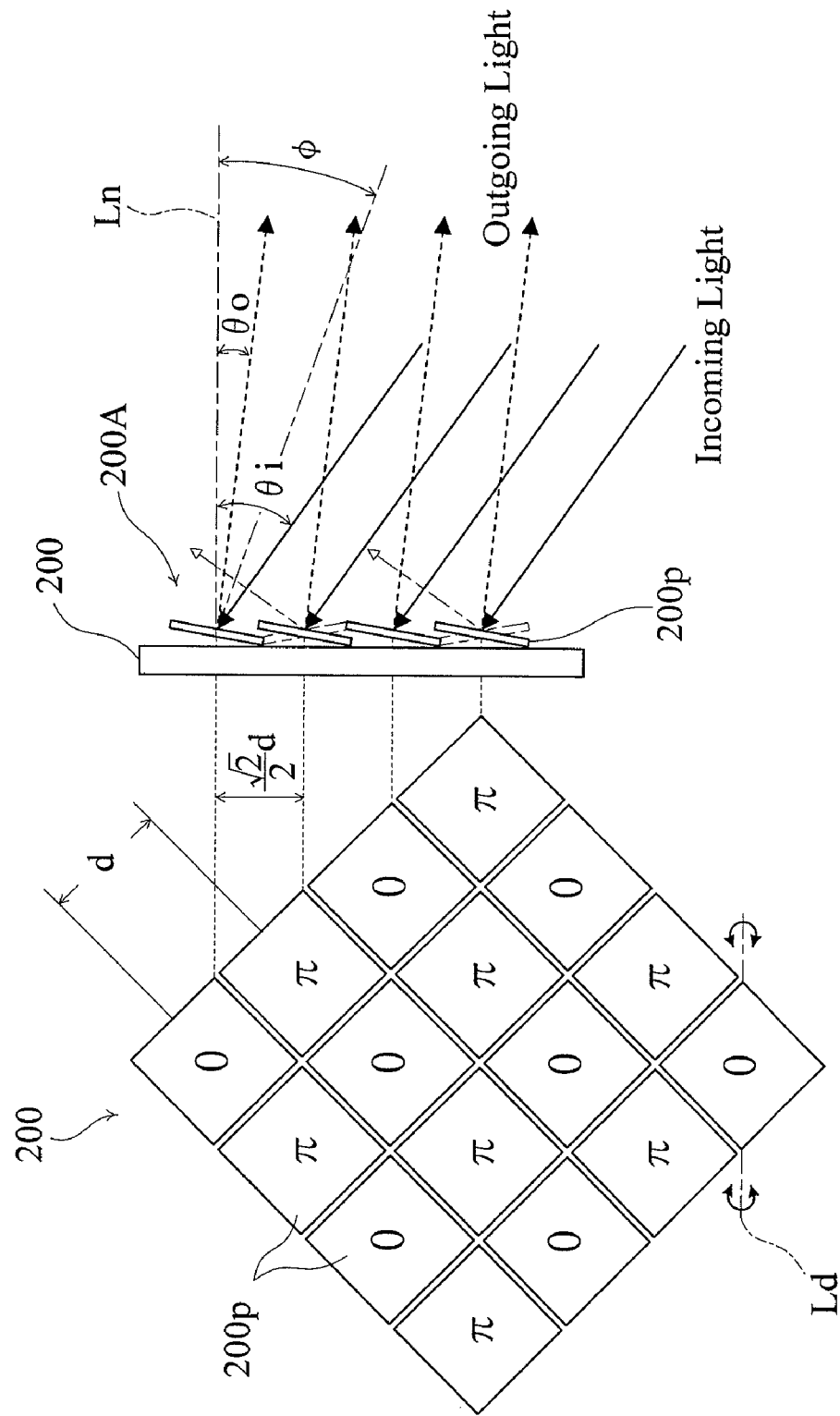
FIG. 5 is a conceptual diagram for describing an optical characteristic of a phase modulator which represents a primary portion of a hologram recorder according to a second embodiment of the present invention.
Figure 6:
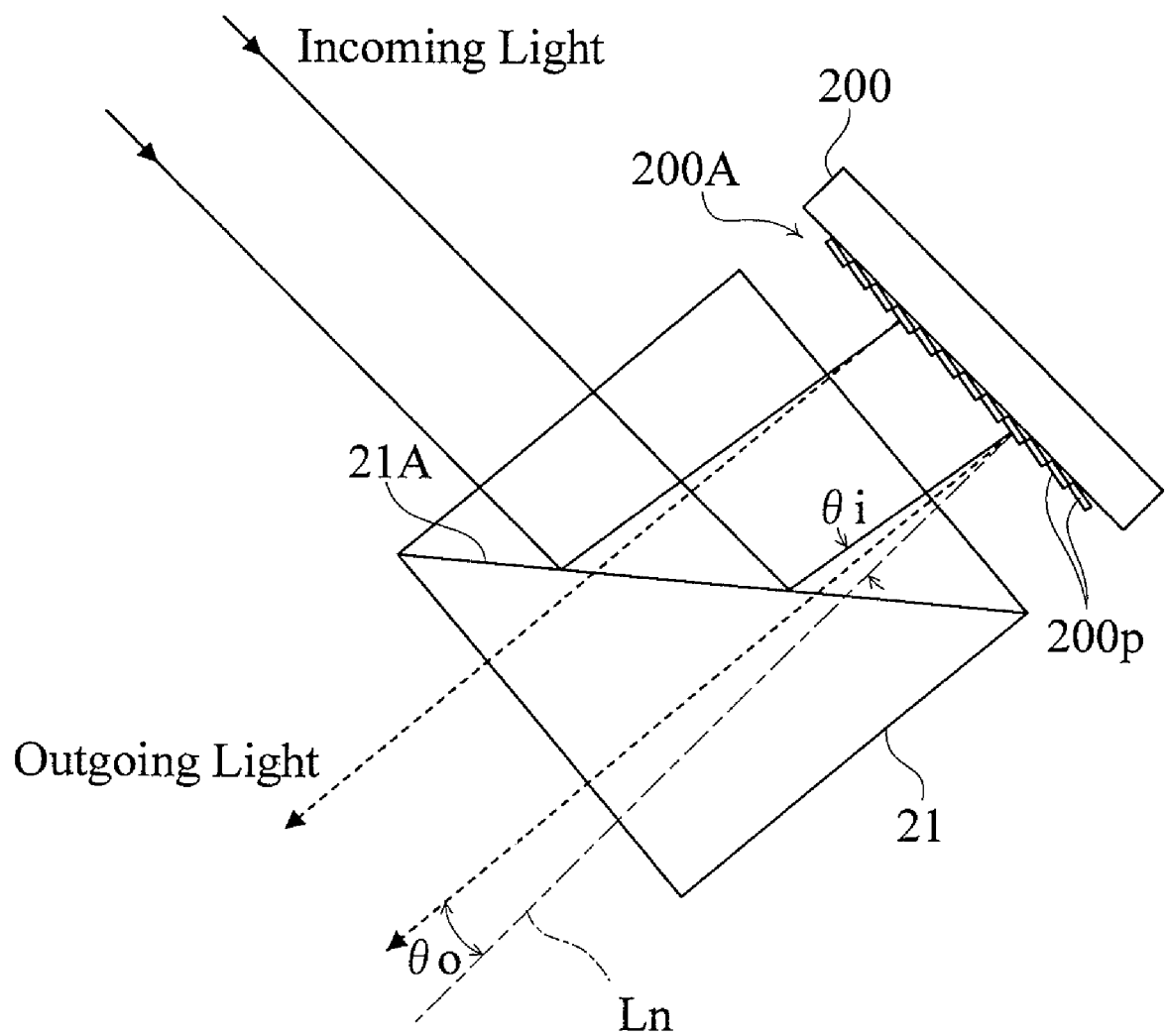
FIG. 6 an optical path diagram showing optical path examples in the phase modulator in FIG. 5.

FIG. 5 and FIG. 6 show a second embodiment of the hologram recorder according to the present embodiment. It should be noted here that the hologram recorder according to the present embodiment has essentially the same configuration as the one shown in FIG. 1, as a whole. In describing the embodiment hereinafter, components and elements identical with or similar to those which are already covered will be indicated by the same reference symbols, and their description will not be repeated.

In the hologram recorder according to the present embodiment, a phase modulator 200 is provided by a deformable mirror device. This phase modulator 200 has a large number of movable reflection devices 200p each movable to predetermined tilt angles +φ/−φ with respect to a reference line i.e. a normal line Ln drawn to the beam reflection surface 200A. These movable reflection devices 200p are placed in a grid pattern. The movable reflection devices 200p are spaced vertically and horizontally by a pitch d which is 13.7 μm for example. Each movable reflection device 200p has a rotation axis on its diagonal line Ld, and is flipped about this rotation axis to the tilt angle +φ/−φ by an ON/OFF control. The tilt angle φ in each movable reflection device 200p is approximately 12 degrees for example.

When the movable reflection device 200p assumes an ON mode as shown in solid lines in FIG. 5 for example, and a reference beam enters the movable reflection device 200p at an incoming angle of θi with respect to the beam reflection surface 200A, the reference beam makes a reflection in accordance with the tilt angle φ of the movable reflection device 200p, and the reference beam comes out in a direction at an outgoing angle θo with respect to the beam reflection surface 200A. On the other hand, as shown in imaginary lines in FIG. 5, when the movable reflection device 200p assumes an OFF mode, a reference beam which enters the movable reflection device 200p comes out in a direction indicated by an outline arrow (in a predetermined direction which differs from the direction of the outgoing angle θo). In the movable reflection device 200p, an array of 10×10 pixels, for example, in vertical and horizontal directions represents a unit area or a cell (not illustrated).

The phase modulator 200 provided by such movable reflection devices 200p as described is able to give a phase difference when appropriate design is made for the reference beam incoming angle θi with respect to the beam reflection surface 200A, the device-to-device pitch d, etc. The phase pattern is similar to the one shown in FIG. 2, i.e. a phase pattern based on the cell as a unit is formed. Specifically, movable reflection devices 200p whose phase difference is 0 and movable reflection devices 200p whose phase difference is π satisfy the following conditional expression, and thereby making alternating rows. In the following expression, a beam from the beam source has a wave length λ, and a pitch between the movable reflection devices 200p is d, and m represents an integer.

$$\frac{\sqrt{2}}{2}d(\sin\theta i + \sin\theta o) = \left(m + \frac{1}{2}\right)\lambda \quad \text{Formula 3}$$

Here, the following equation holds for the tilt angle φ of the movable reflection device 200p, the incoming angle θi and the outgoing angle θo:

$$\theta i + \theta o = 2_\phi \quad \text{Formula 4}$$

For example, take a case where the beam source provides a green beam, with λ=0.532 μm, d=13.7 μm, and φ=12 degrees. Under an adjustment which makes m=7, the incoming angle θi is approximately 19.27 degrees while the outgoing angle θo is approximately 4.73 degrees. In other words, a reference beam which comes to the beam reflection surface 200A at an incoming angle θi makes a reflection on the movable reflection device 200p in the ON mode, and goes out in the direction of an outgoing angle of θo. When viewed along a direction perpendicular to the diagonal line Ld as exemplified in FIG. 5, (viewed along the vertical direction in the figure), movable reflection devices 200p whose phase difference is 0 and movable reflection devices 200p whose phase difference is π appear alternately with each other in rows. By turning only these movable reflection devices 200p whose phase difference is 0 to the ON mode, a zero-type cell are formed while by turning only these movable reflection devices 200p whose phase difference is π to the ON mode, a pi-type cells are formed. When all the movable reflection devices 200p whose phase difference is 0 or π are turned to the OFF mode, a beam blocking cell is formed.

Figure 7:
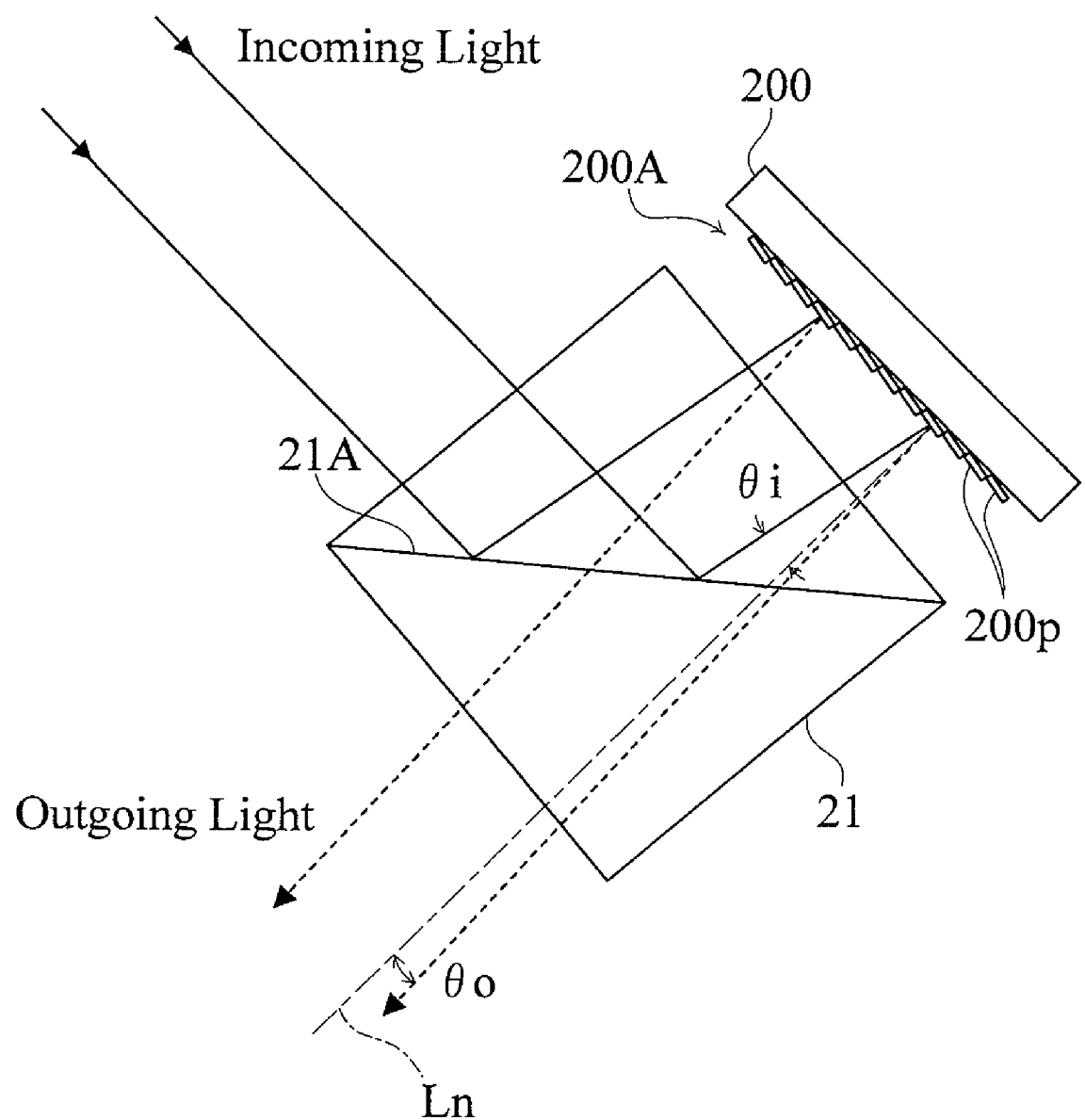
FIG. 7 is an optical path diagram showing another set of optical path examples in the phase modulator in FIG. 5.

FIG. 7 shows an example of a case where the beam source provides a blue beam, with λ=0.405 μm, and the other factors being the same as the above. Under an adjustment which makes m=9, the incoming angle θi is approximately 28.96 degrees while the outgoing angle θo is approximately −4.96 degrees (on the opposite side of the incoming angle θi, with the normal line Ln of the beam reflection surface 200A being an axis of symmetry).

The reference beam which comes out of the phase modulator 200 as a reflected beam of an outgoing angle of θo travels again through the fourth beam splitter 21, and hits the hologram recording medium just as in the previous embodiment.

According to the phase modulator 200 provided by the movable reflection devices 200p as described above, again, it is possible to modulate the reference beam into a beam of a desirable phase pattern by simply turning the movable reflection device 200p into the ON/OFF modes, and therefore it is possible to perform ON/OFF control on each movable reflection device 200p easily.

Although the movable reflection device 200p is operated mechanically, the device has a remarkably higher response speed than ferroelectric liquid crystal molecules for example, because the size of the device is extremely small. Therefore, it is possible to switch the phase pattern more quickly than in the previous embodiment, and therefore it is possible to further increase the hologram recording speed per page. For example, a hologram recorder which utilizes a phase modulator 200 according to the present embodiment can achieve a page recording speed of approximately 7000 pages/sec, which means that it is possible to further enhance the advantages of the phase code multiplexing method.

Therefore, a hologram recorder which utilizes a phase modulator 200 according to the present embodiment makes it possible to simplify configuration and workings for phase modulation using the phase code multiplexing, enabling to increase hologram recording speed.

Figure 8:
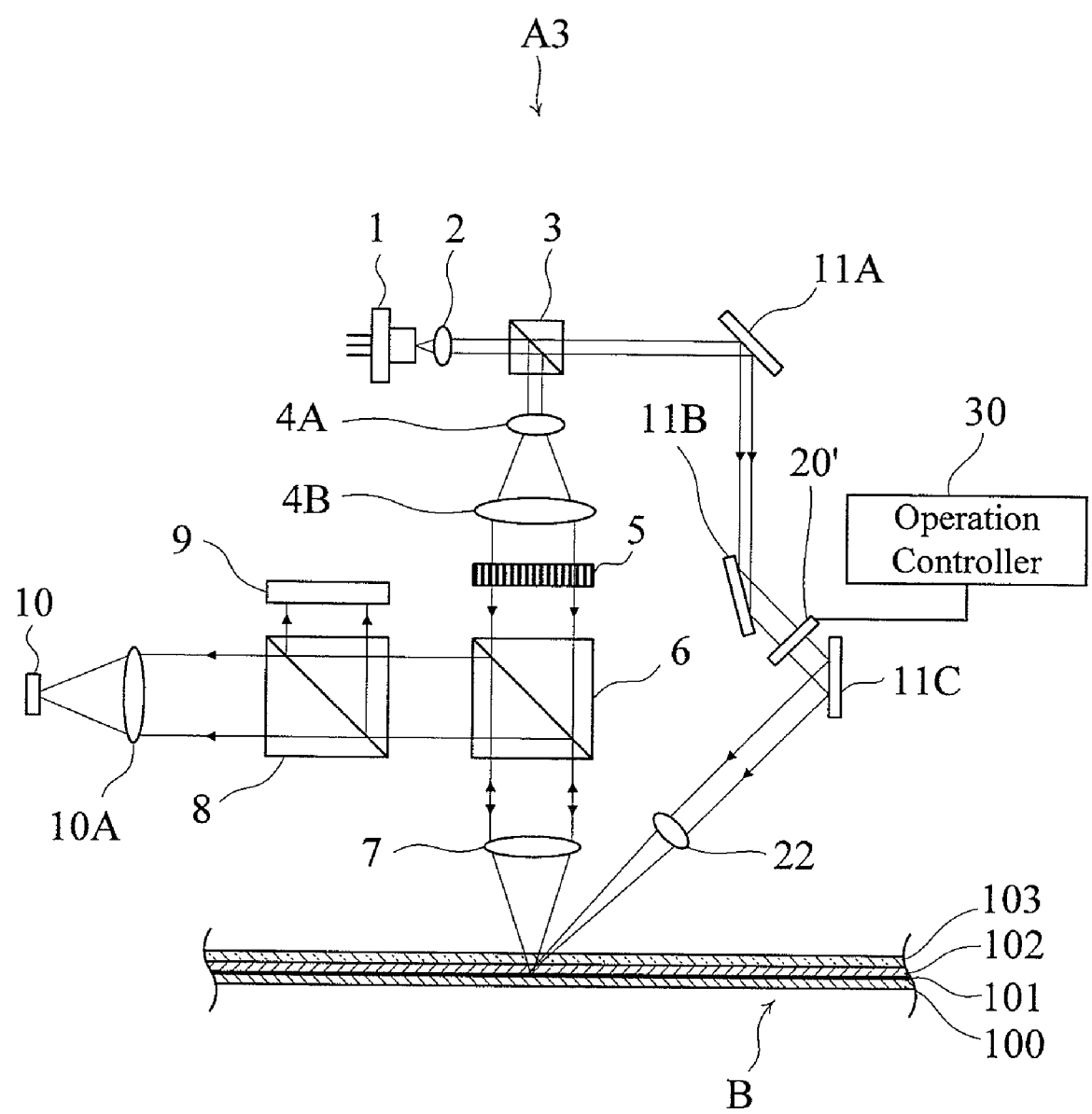
FIG. 8 is a configuration diagram of a hologram recorder according to a third embodiment of the present invention.

FIG. 8 shows a third embodiment of the hologram recorder according to the present embodiment. The hologram recorder A3 according to the present embodiment, which includes a phase modulator 20' provided by transmissive liquid-crystal devices having ferroelectric liquid crystal molecules, has basically the same configuration as the first embodiment shown in FIG. 1. A reference beam which has passed through the phase modulator 20' is directed by a reflector plate 11C to the object lens 22. Though not illustrated in particular, the phase modulator 20' which is composed of such transmissive liquid-crystal devices as described above is provided with phase films in such a way that liquid crystal devices whose phase difference is 0 and liquid crystal devices whose phase difference is π alternate with each other. The basic operational principle is that a phase difference is given when the reference beam passes through. In all the other aspects, the phase pattern is formed in essentially the same principle as in the first embodiment. Therefore, according to the hologram recorder A3 offered by the present embodiment, it is also possible to obtain the same advantages as achieved by the first embodiment.

Figure 9:
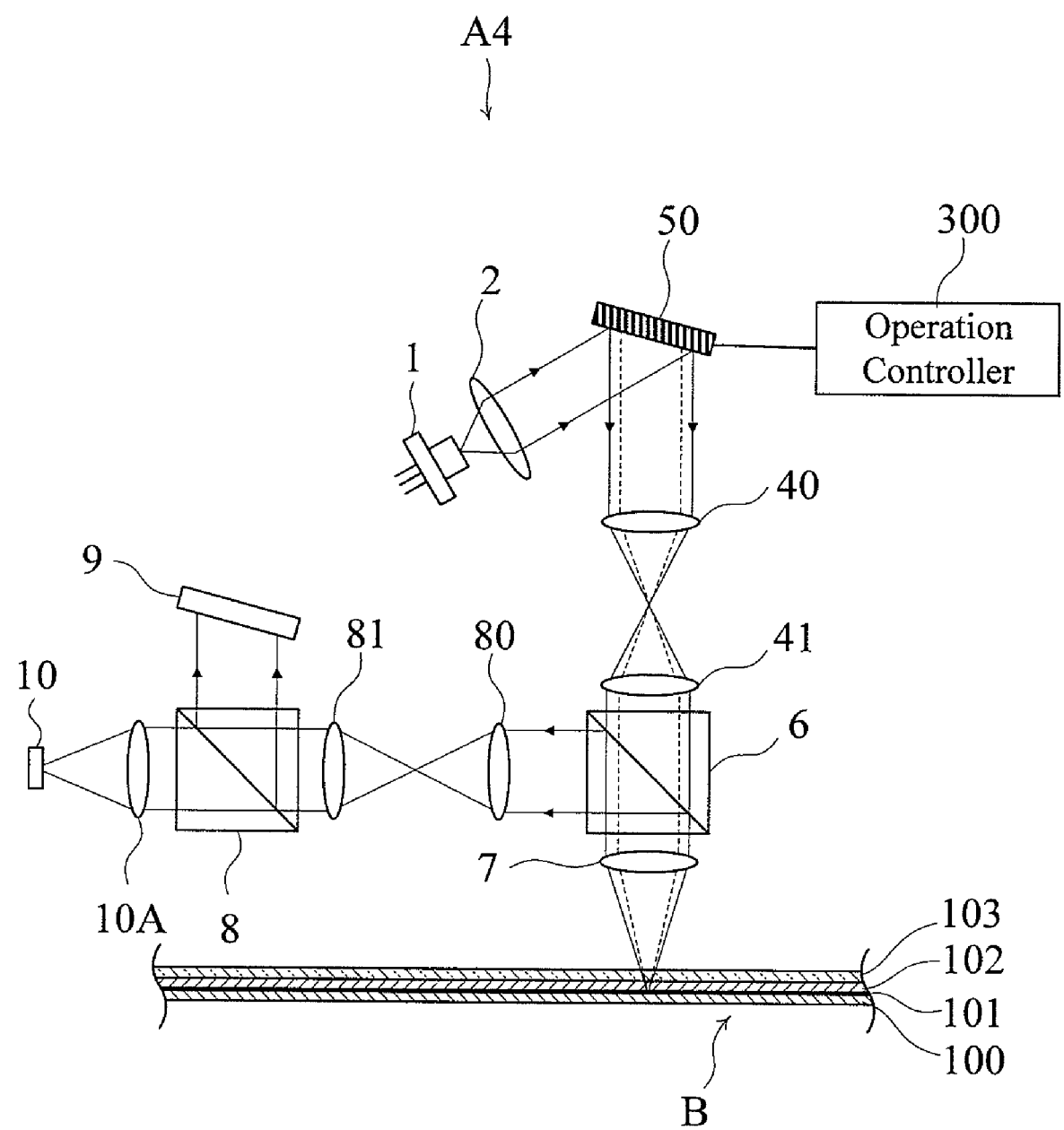
FIG. 9 is a configuration diagram of a hologram recorder according to a fourth embodiment of the present invention.
Figure 10:
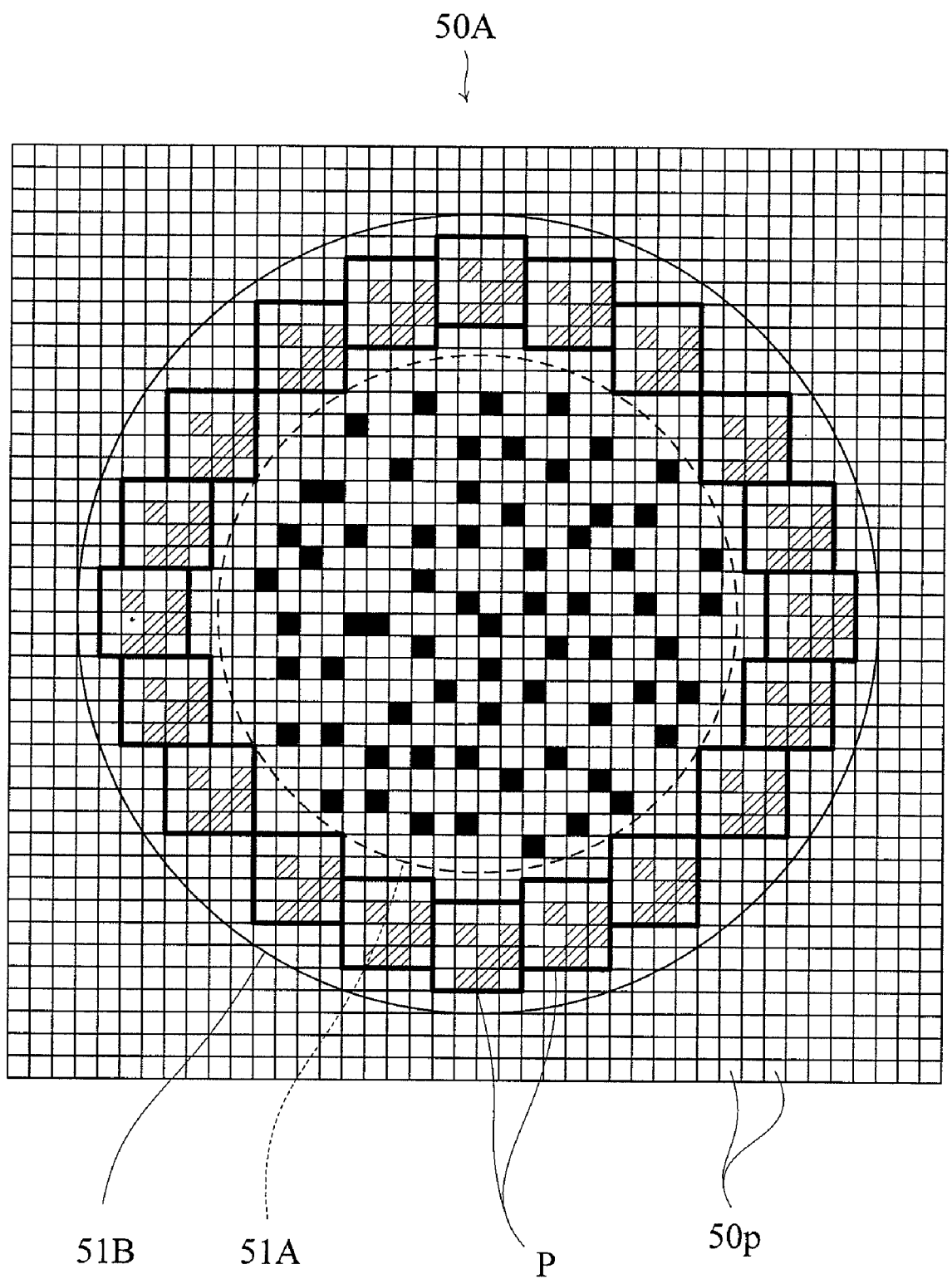
FIG. 10 is a plan view of a spatial light modulator which represents a primary portion of the hologram recorder in FIG. 9.

FIG. 9 and FIG. 10 show a fourth embodiment of the hologram recorder according to the present invention. A hologram recorder A4 according to the present embodiment includes a beam source 1, a collimator lens 2, a spatial light modulator 50 which receives almost all of the beam from the beam source 1, first relay lenses 40, 41, a beam splitter 6 and an object lens 7 for recording/reconstructing purpose, second relay lenses 80, 81, a beam splitter 8 for separating a reconstruct beam, a beam reception sensor 9 for reconstruct purpose, a condenser lens 10A and a beam reception sensor 10 for servo control, and an operation control section 300 which controls the spatial light modulator 50.

The laser beam from the beam source 1 is converted by the collimator lens 2 into a parallel beam. Almost all of the parallel beam which comes out of the collimator lens 2, enters the spatial light modulator 50. The spatial light modulator 50 has substantially the same configuration as the phase modulator 200 according to the second embodiment, being provided by a deformable mirror device which includes a large number of movable reflection devices 50p. The spatial light modulator 50 functions partially as beam phase modulation means.

As shown in FIG. 10, the spatial light modulator 50 includes: a first beam modulation region 51A which modulates part of the incoming beam into a beam which has a pixel pattern according to the information to be recorded and then outputting the modulated beam as a signal beam; and a second beam modulation region 51B which modulates the phase of the remaining part of the incoming beam into a beam having a desired phase pattern P and then outputs the phase-modulated beam as a reference beam. The signal beam and the reference beam travel along the same optical path to the first relay lenses 40, 41, then to the beam splitter 6 and the object lens 7, and finally hit a predetermined site on the hologram recording medium B in an overlapping manner with each other.

In the example given in FIG. 10, the first beam modulation region 51A is provided at a center area of the beam reflection surface 50A while the second beam modulation region 51B is provided in a perimeter area outside of the center area. It should be noted here that the arrangement may be a reverse of the above; i.e. the second beam modulation region may be provided at a center area of the beam reflection surface, with the first beam modulation region being provided in a perimeter area outside of the center area. Still another example may be that a half or one side of the beam reflection surface may be the first beam modulation region, with the other half or the other side being the second beam modulation region. The second beam modulation region 51B as described above is built with substantially the same design parameters and operation principle as for the phase modulator 200 according to the second embodiment described earlier, and hence forms a phase pattern P indicated in frames which are drawn in thick solid lines. Therefore, in order to direct the signal beam and the reference beam perpendicularly to the object lens 7 and to the hologram recording medium B, the spatial light modulator 50 is slanted by a predetermined angle with respect to these components. Also, the reconstruct-purpose beam reception sensor 9 is slanted by a predetermined angle so as to capture a proper image according to the tilt of the spatial light modulator 50. The operation control section 300 controls the movable reflection devices 50p in the first beam modulation region 51A for formation of a signal beam which has a desired pixel pattern, while controlling the movable reflection devices 50p in the second beam modulation region 51B for formation of a reference beam which has a desired phase pattern.

As described, the beam reflection surface 50A of the spatial light modulator 50 may be divided into a first beam modulation region 51A and a second beam modulation region 51B, with the second beam modulation region 51B producing a reference beam which has a desired phase pattern. With such an arrangement as the above, it is again possible to modulate a beam into a reference beam which has a desired phase pattern, by simply turning the movable reflection devices 50p into ON/OFF modes, and the ON/OFF control on each of the movable reflection devices 50p is very easy. Therefore, with the hologram recorder A4 which includes a phase modulator 50 according to the present embodiment, again, it becomes possible to simplify configuration and workings for phase modulation using the phase code multiplexing, and it becomes possible to increase hologram recording speed.

In particular, according to the present embodiment, a single spatial light modulator 50 produces a signal beam of a desired pixel pattern and a reference beam of a desired phase pattern. This simplification of the optical system facilitates size reduction and cost reduction of the recorder.

It should be noted here that the spatial light modulator may be provided by a liquid-crystal device which is divided into a first beam modulation region and a second beam modulation region.

Figure 11:
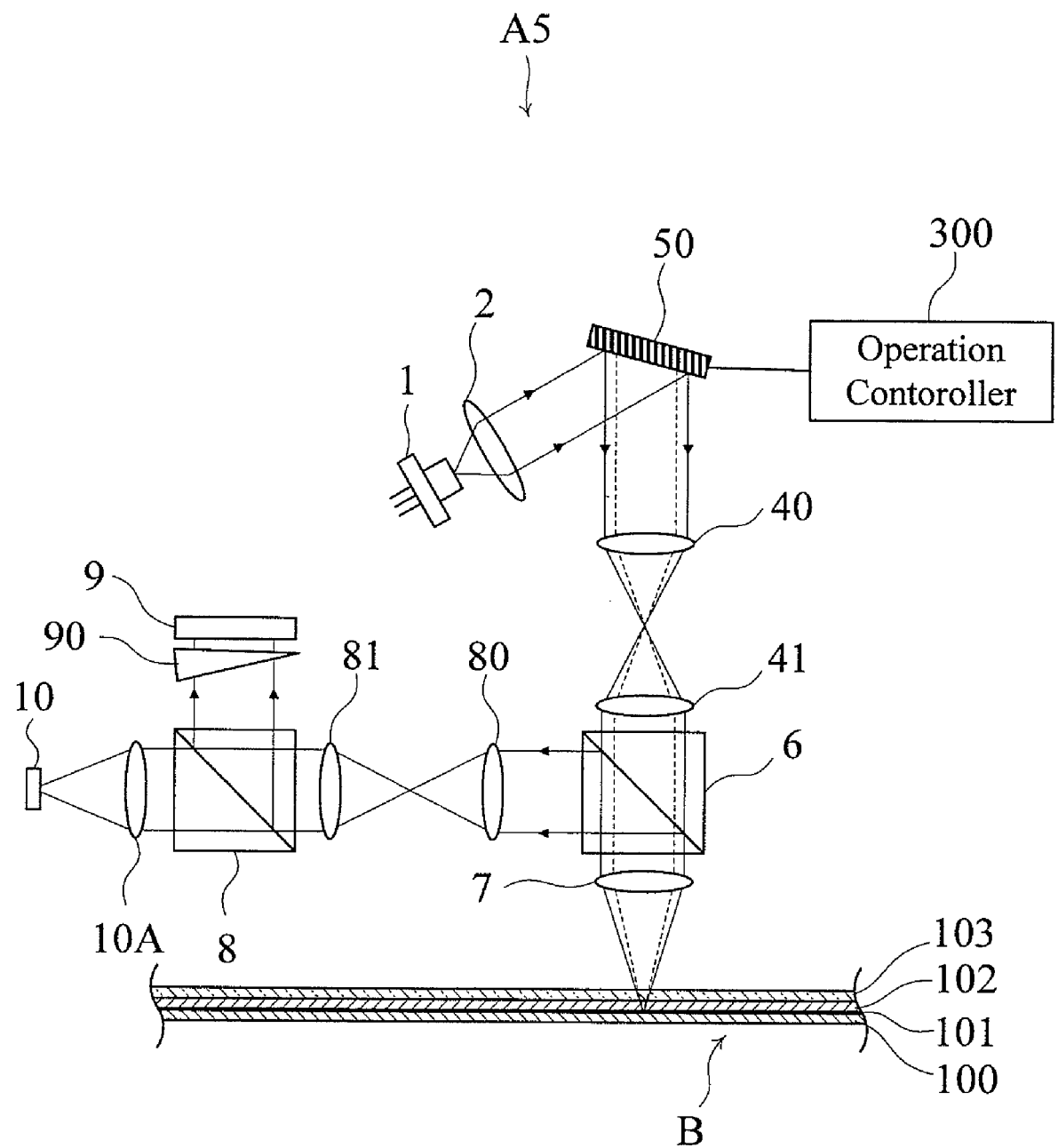
FIG. 11 is a configuration diagram of a hologram recorder according to a fifth embodiment of the present invention.

FIG. 11 shows a fifth embodiment of the hologram recorder according to the present invention. The hologram recorder A5 according to the present embodiment has basically the same configuration as the fourth embodiment, differing, however, from the fourth embodiment in that the present embodiment includes a prism 90 as an optical path adjuster between the reply beam separation purpose beam splitter 8 and the reconstruct-purpose beam reception sensor 9. The prism 90 helps capturing a proper image according to the tilt of the spatial light modulator 50 by refracting the reconstruct beam by a predetermined angle as the reconstruct beam travels to the beam reception sensor 9. Therefore, it is possible to make sure that the beam reception sensor 9 has its beam reception surface perpendicular to the beam axis of the signal beam and reference beam. According to the hologram recorder A5 offered by the fifth embodiment, it is also possible to obtain the same advantages as achieved by the fourth embodiment.

Figure 12:
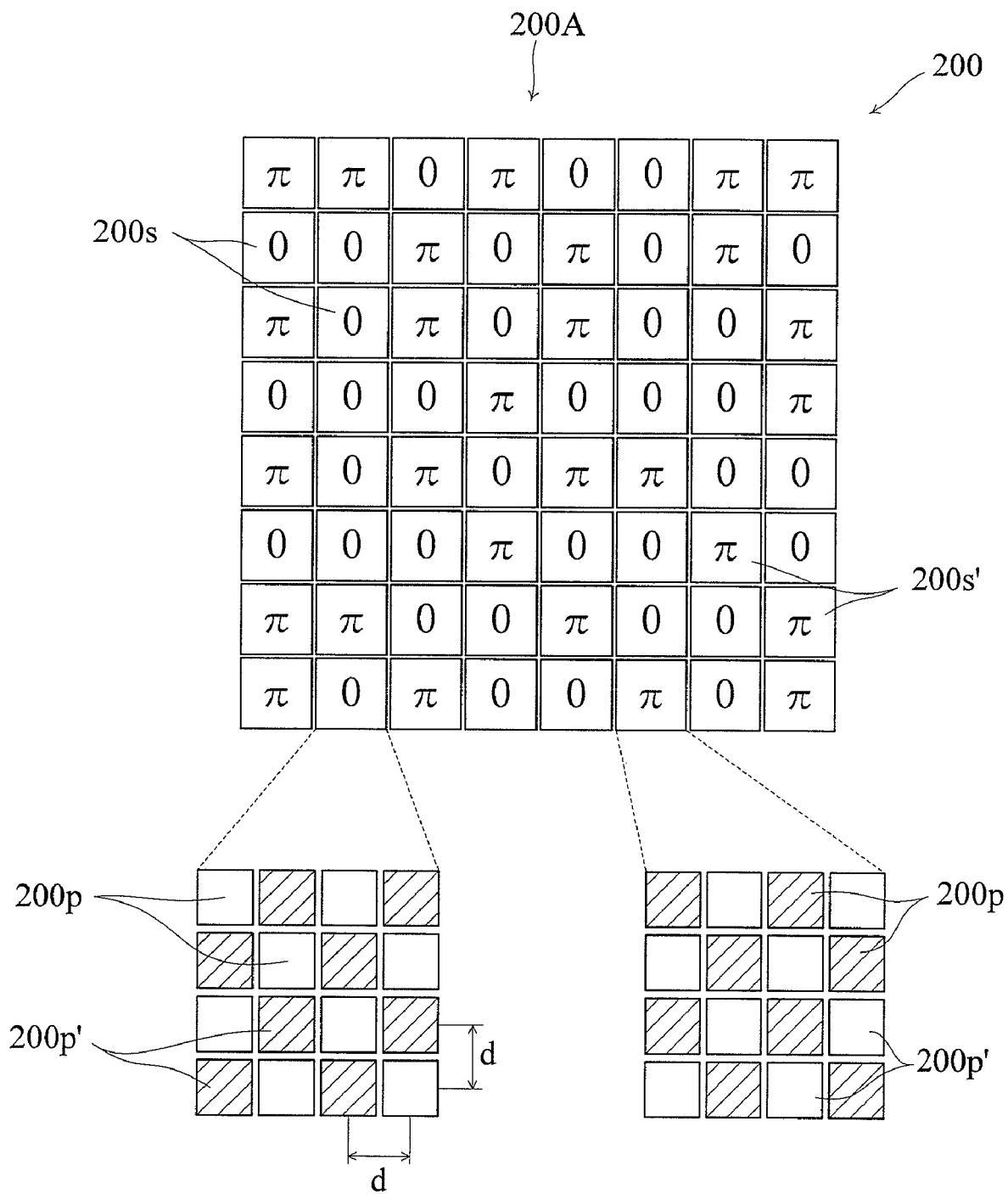
FIG. 12 is an illustrative diagram for a hologram recorder according to a sixth embodiment of the present invention.

FIG. 12 shows a sixth embodiment of the hologram recorder according to the present invention. Configurationally, the hologram recorder according to the present embodiment uses the same phase modulator 200 as shown in FIG. 5, etc. However, the operation control section uses a different method for making a phase pattern, from the one shown in FIG. 2.

Specifically, the operation control section uses, for example, movable reflection devices indicated by reference symbols 200p, 200p' as minimum unit of pixels. These pixels 200p, 200p' are grouped into cells each composed of a vertical and horizontal arrays of 4×4 pixels, and control is provided so that each of the cells 200s, 200s' produces a beam whose phase difference is 0 or a beam whose phase difference π, randomly. More specifically, when only those movable reflection devices 200p whose phase difference is 0 assume an ON mode, the cell becomes a zero-type cell 200s (those cells 200s marked with 0) which produces a beam whose phase difference is 0 whereas when only those movable reflection devices 200p' whose phase difference is π assume the ON mode, the cell becomes a pi-type cell 200s' (those cells 200s' marked with π) which produces a beam whose phase difference is π, and these two types are produced randomly. With such a random phase pattern, multiplex hologram recording is possible using the same principle as so-called speckle-shift multiplexed recording method, i.e. by using a reference beam which has a speckle phase distribution. Therefore, according to the hologram recorder offered by the present embodiment, it is possible to record holograms in a multiplex manner per page by switching to different reference beams which have extremely low correlation with each other, and thereby to further reduce crosstalk among the multiplexed holograms.

Figure 13:
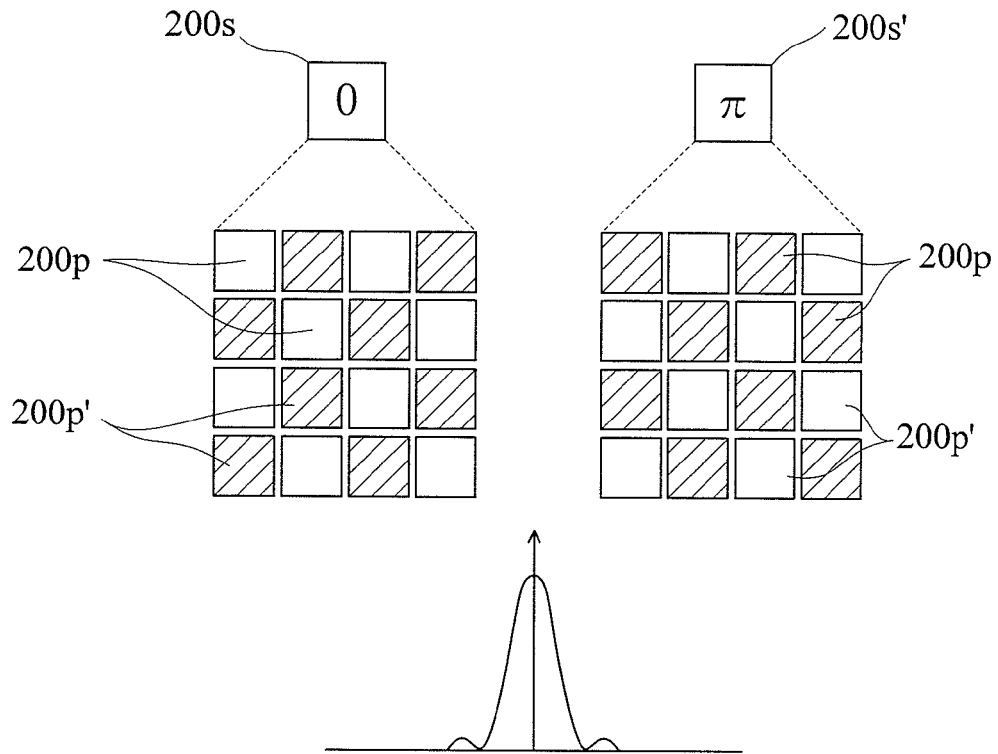
FIG. 13 is an illustrative diagram for describing a beam intensity difference, as a reference.
Figure 13:
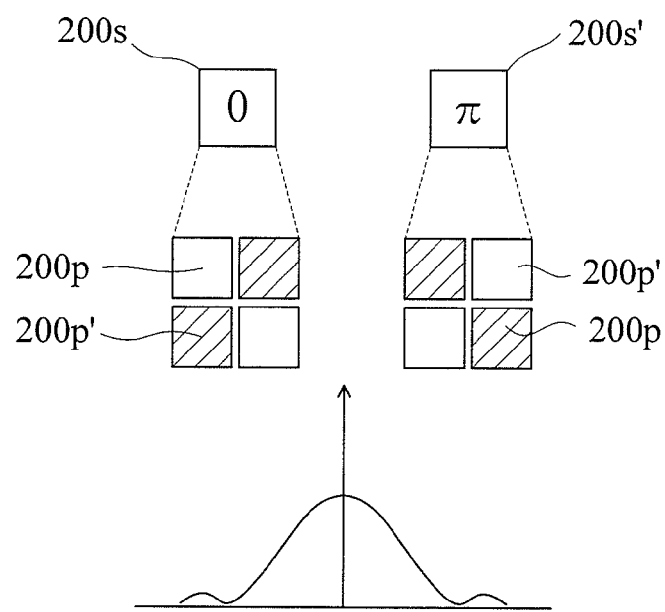

FIG. 13(A) and FIG. 13(B) show two reference examples: a beam intensity distribution when cells 200s, 200s' were made of a 4×4 matrix of pixels 200p, 200p'; and a beam intensity distribution when cells 200s, 200s' were made of a 2×2 matrix of pixels 200p, 200p'. In general, the phase pattern becomes coarser with an increase in the number of pixels 200p, 200p' which constitute each of the cells 200s, 200s' since the number of pixels in the phase modulator 200 is finite. A coarse pattern will give sharp and strong beam intensity. Therefore, in terms of beam intensity, the larger the number of pixels which constitute the unit cell 200s, 200s', the more preferable it is. However, since it is necessary to uniformalize the intensity distribution over a total number of pixels each having a phase difference 0 or a phase difference π, it is preferable that the matrix of pixels which constitute a cell have an even number of pixels in each of the horizontal and vertical rows. This arrangement, where an even number of pixels are disposed in horizontal and vertical rows of the matrix, always assures that the number of pixels whose phase difference is 0 is the same as the number of pixels whose phase difference is π, and therefore assures a substantially uniform beam intensity distribution over the entire pixel.

Figure 14:
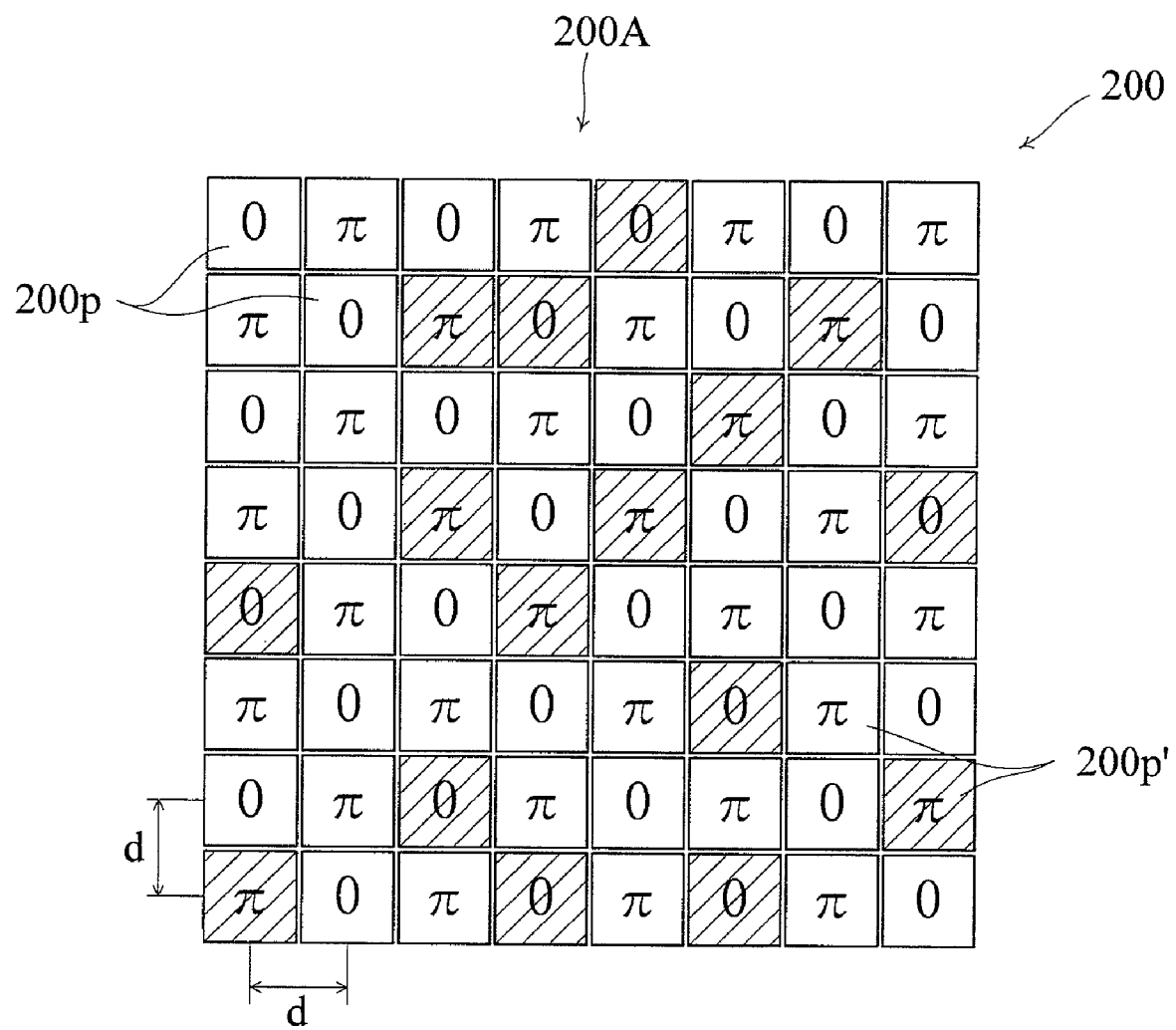
FIG. 14 is an illustrative diagram of a hologram recorder according to a seventh embodiment of the present invention.

FIG. 14 shows a seventh embodiment of the hologram recorder according to the present invention. Again, configurationally, the hologram recorder according to the present embodiment uses the same phase modulator 200 as shown in FIG. 5, etc. However, the operation control section uses a different method for making a phase pattern, from the one shown in FIG. 12.

Specifically, the operation control section controls each of the pixels 200p, 200p' for random formation of a beam whose phase difference is 0 or a beam whose phase difference is π. The pixels 200p, 200p' are spaced from the adjacent ones by an appropriate pitch d, so that when all of the pixels 200p, 200p' are in ON mode, there is a regular pattern of beams whose phase difference is 0 and beams whose phase difference is π. However, as indicated by hatching in FIG. 14, when a predetermined number of pixels 200p, 200p' are randomly turned to OFF mode, beams whose phase difference is 0 or π are produced randomly from respective pixels 200p, 200p'. With such a random phase pattern per pixels 200p, 200p', multiplex hologram recording is also possible, using a reference beam which has a speckle phase distribution. Therefore, according to the hologram recorder offered by the present embodiment, it is possible to further reduce crosstalk among the multiplexed holograms.

Figure 15:
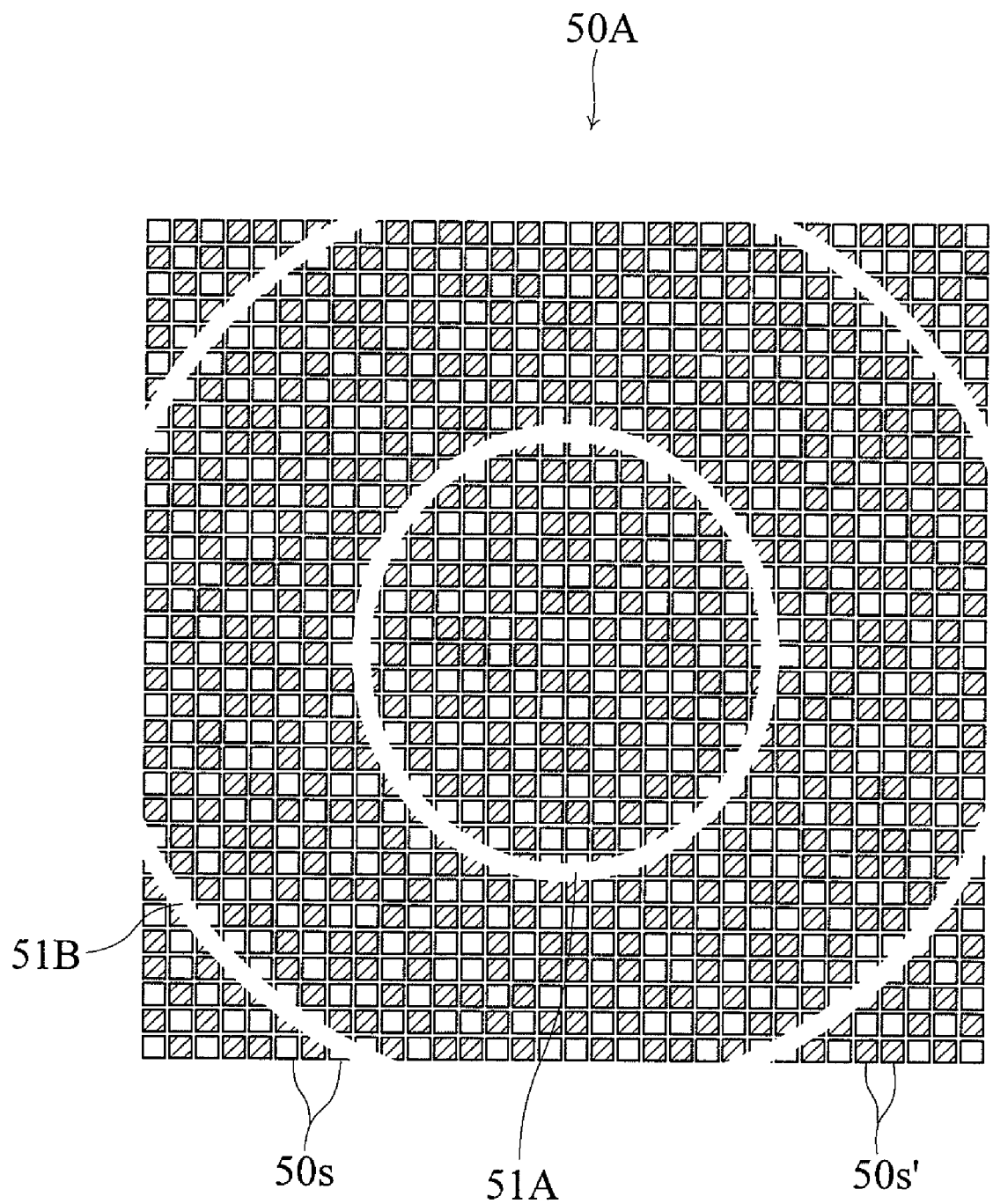
FIG. 15 is an illustrative diagram of a hologram recorder according to an eighth embodiment of the present invention.
Figure 16:
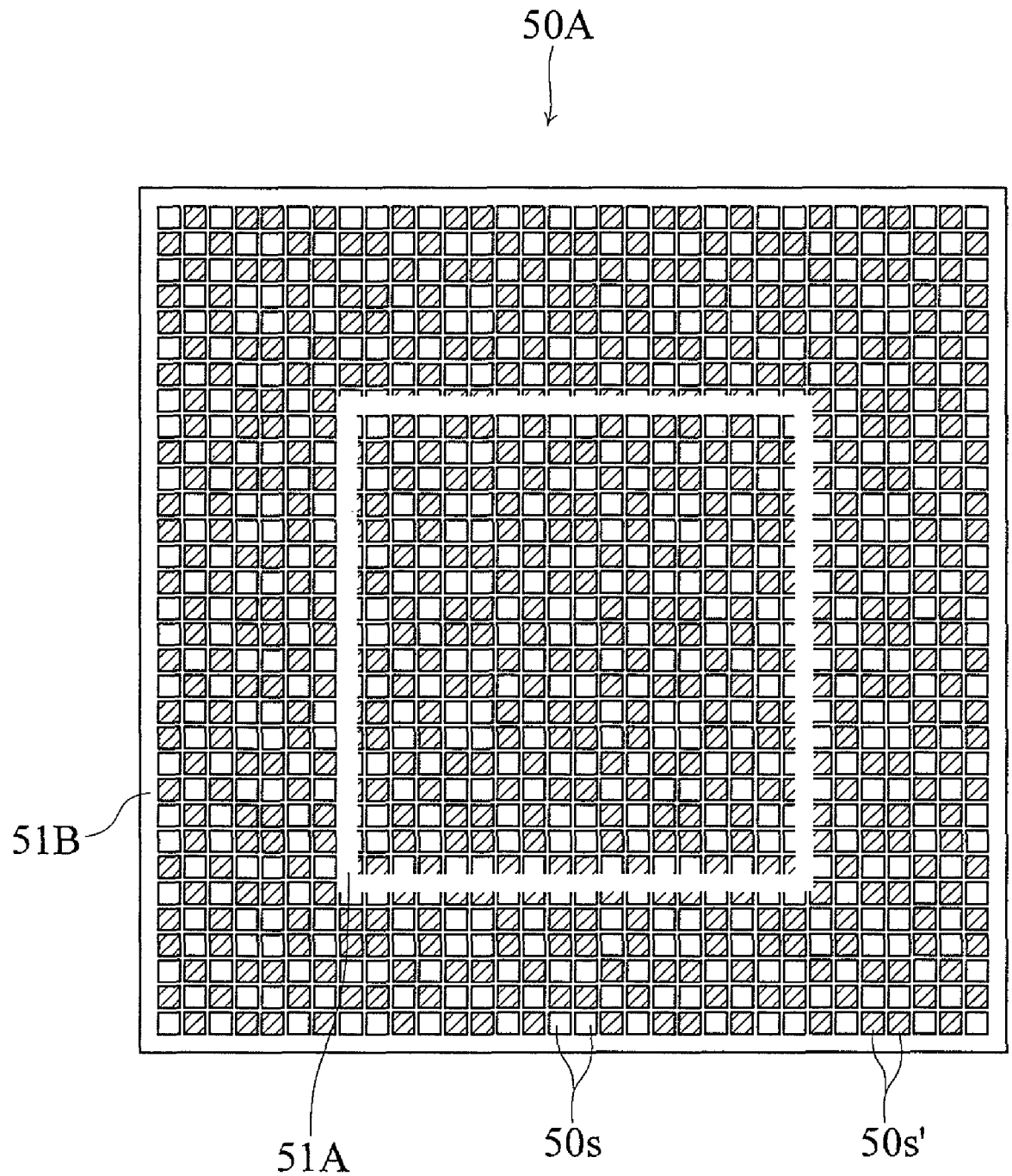
FIG. 16 is an illustrative diagram of a hologram recorder according to a ninth embodiment of the present invention.

FIG. 15 shows an eighth embodiment of the hologram recorder according to the present invention while FIG. 16 shows a ninth embodiment of the hologram recorder according to the present invention. Configurationally, the hologram recorders according to these embodiments use the same spatial light modulator 50 as shown in FIG. 9, etc. However, a first beam modulation region 51A which outputs a signal beam and a second beam modulation region 51B which outputs a reference beam differ from those shown in FIG. 10. It should be noted here that a large number of boxes shown in FIG. 15 and FIG. 16 represent cells 50s, 50s'. The cells 50s produce a beam whose phase difference is 0 whereas the hatched cells 50s' produce a beam whose phase difference is π. Therefore, phase patterns shown in FIG. 15 and FIG. 16 are also results of a random production of beams whose phase difference is 0 or π by respective cells 50s, 50s'.

As shown in FIG. 15, a first beam modulation region 51A is provided circularly at a center area of the beam reflection surface 50A while a second beam modulation region 51B is provided annularly outside of the center area or in a perimeter area of the beam reflection surface 50A. The second beam modulation region 51B is partially out of the beam reflection surface 50A, so the reference beam loses part of the beam correspondingly on the four sides before reaching the hologram recording medium. With such a reference beam, it is also possible to make multiplex recording of holograms while further reducing crosstalk, because of a random phase pattern made of beams whose phase difference is 0 or π.

As shown in FIG. 16, the first beam modulation region 51A may be square in a center area of the beam reflection surface 50A, with the second beam modulation region 51B formed like a square frame outside of the first beam modulation region 51A. With such a division of the area, it is also possible to make multiplex recording of holograms while further reducing crosstalk.

The invention claimed is:

1. A hologram recorder in which coherent light from a light source is split into a signal beam and a reference beam, the signal beam is modulated by a spatial light modulator to be directed to a hologram recording medium, the reference beam is directed to the hologram recording medium to overlap with the signal beam for recording a hologram on the hologram recording medium, the hologram recorder comprising:

a beam phase modulator including a plurality of optical devices each configured to assume one of two modes such as ON mode and OFF mode, the ON mode for causing the reference beam to be passed or reflected in a predetermined direction toward the hologram recording medium, the OFF mode for causing the reference beam to be blocked or directed in another direction other than said predetermined direction, each optical device providing a predetermined phase difference; and a phase modulation controller for individually controlling the optical devices to cause each of the optical devices to assume the ON mode or the OFF mode, thereby modulating the reference beam into a beam having a predetermined phase pattern.

2. The hologram recorder according to claim 1, wherein the optical devices include first types of 0 phase difference and second types of π phase difference as the predetermined phase difference, these two types being disposed alternately with each other.

3. The hologram recorder according to claim 2, wherein the optical devices are grouped into cells each including a predetermined number of optical devices, the phase modulation controller performs control for each cell so that at least one of the 0 phase difference type and the π phase difference type in said each cell is in the OFF mode.

4. The hologram recorder according to claim 3, wherein the predetermined phase pattern is generated by light of 0 phase difference and light of π phase difference at an interval defined by a predetermined number of the cells.

5. The hologram recorder according to claim 4, wherein the predetermined phase pattern corresponds to a Walsh-Hadamard Transform matrix pattern.

6. The hologram recorder according to claim 3, wherein the predetermined phase pattern is generated randomly for each cell by light of 0 phase difference and light of $\pi$ phase difference.

7. The hologram recorder according to claim 2, wherein the phase modulation controller performs control for each of the optical devices so that said each optical device is randomly in the ON mode or the OFF mode, the predetermined phase pattern being generated randomly by light of 0 phase difference or light of $\pi$ phase difference for each optical device.

8. The hologram recorder according to claim 2, wherein the optical devices comprise liquid crystal devices of alternately different thicknesses.

9. The hologram recorder according to claim 2, wherein the optical devices are provided by a plurality of movable reflection devices cooperating to form a beam reflection surface, each movable reflection device assuming a predetermined tilt angle with respect to the beam reflection surface upon coming into the ON mode or the OFF mode.

10. The hologram recorder according to claim 9, wherein the movable reflection devices satisfy a condition given by following equations, where d represents a pitch between mutually adjacent devices, $\phi$ represents the predetermined tilt angle with respect to the beam reflection surface, $\theta i$ and $\theta o$ represent a beam incoming angle and a beam reflection angle with respect to the beam reflection surface, $\lambda$ represents a wavelength of the beam, and m represents an integer.

$$\frac{\sqrt{2}}{2}d(\sin\theta i + \sin\theta o) = \left(m + \frac{1}{2}\right)\lambda, \quad \text{Formula 1}$$

-continued $$\theta i + \theta o = 2\phi. \quad \text{Formula 2}$$

11. The hologram recorder according to claim 1, wherein the optical devices comprise liquid crystal devices of alternately different thicknesses.

12. The hologram recorder according to claim 1, wherein the optical devices are provided by a plurality of movable reflection devices cooperating to form a beam reflection surface, each movable reflection device assuming a predetermined tilt angle with respect to the beam reflection surface upon coming into the ON mode or the OFF mode.

13. The hologram recorder according to claim 12, wherein the movable reflection devices satisfy a condition given by following equations, where d represents a pitch between mutually adjacent devices, $\phi$ represents the predetermined tilt angle with respect to the beam reflection surface, $\theta i$ and $\theta o$ represent a beam incoming angle and a beam reflection angle with respect to the beam reflection surface, $\lambda$ represents a wavelength of the beam, and m represents an integer, $$\frac{\sqrt{2}}{2}d(\sin\theta i + \sin\theta o) = \left(m + \frac{1}{2}\right)\lambda, \quad \text{Formula 1}$$

$$\theta i + \theta o = 2\phi. \quad \text{Formula 2}$$

* * * * *